Patented Nov. 30, 1948

2,455,188

UNITED STATES PATENT OFFICE 2,455,188

DRILLING FLUID

William F. Oxford, Jr., Beaumont, Tex., assignor to Sun Oil Company, Philadelphia, Pa., a corporation of New Jersey No Drawing. Application February 25, 1946, Serial No. 650,143

6 Claims. (Cl. 252—8.5)

This invention relates to improved drilling fluids for use in the rotary drilling of wells.

In drilling oil and gas wells by the rotary method a drilling fluid is circulated down the drill pipe, through eyes in the drill bit into the borehole and thence to the surface. Its purposes are to seal off the formations penetrated, to cool and lubricate the bit and to carry the drill cuttings to the surface. After each passage through the well cuttings are removed from the drilling fluid by screening or by sedimentation or both, and the drilling fluid is then reused.

Such drilling fluids generally comprise a liquid base, which may be either water or oil depending upon whether an aqueous or a non-aqueous drilling fluid is desired, to which has been added a colloidal material and weighting material such as barytes, iron oxide or calcium carbonate. As the colloidal material, clays such as kaolin or bentonite have been widely used; while in the case of salt water drilling muds, organic colloids, as, for example, starch, have been employed. One purpose of the colloidal material is to impart to the drilling fluid thixotropic properties, i. e. the ability to undergo gelation upon standing but readily to regain fluidity when agitated. This characteristic is desirable in order that the drilling fluid will remain in a free flowing condition as long as it is being circulated, while still having the capacity to gel readily when circulation is ceased and thereby prevent settling of the cuttings in the well. The thixotropic characteristics should be such that the drilling fluid will have a rapid rate of gelation and a low gel strength.

Colloidal materials used heretofore to impart thioxtropic properties inherently possess certain disadvantages which limit their usefulness. For example, colloidal clays tend to flocculate if the drilling mud contains dissolved salt, whereby a mud containing a colloidal clay may lose its thixotropic properties during circulation through the well due to intrusion of salt water. Organic colloids, such as soluble starch, have been proposed to provide thioxtropic characteristics where only salt water is available for preparing the drilling mud or where such intrusion of salt water is apt to be encountered during drilling, but the resulting solution is generally not sufficiently thixotropic. When, in addition to the organic material, clay is added in an amount which can be tolerated without causing flocculation, thus increasing the degree of thixotropy, the resultant mud fluid usually has a gel rate too slow, and a gel strength too high, to be suitable. Furthermore, the use of starch or like organic colloids is disadvantageous in that such materials are subject to bacterial action which will cause putrefaction unless a preservative is added to the drilling mud or unless the drilling mud has an extremely high salt content.

The present invention provides an improved aqueous base drilling fluid, containing an addition agent which imparts to the composition the desired thixotropic characteristics without the disadvantages of previously known additives of this type. Specifically, this addition agent is silica aerogel. I have found that the thixotropic properties of aqueous base drilling fluids may be controlled as desired by incorporating in the composition a suitable amount of finely divided silica aerogel. The resulting composition will be characterized by a rapid rate of gelation and a low gel strength, which characteristics are particularly desirable for obtaining best results. Silica aerogel is especialy useful in preparing salt water drilling muds, since it is not subject to flocculation in the presence of salt as are the colloidal clays.

Silica aerogel is produced by drying silica hydrogel under such conditions that collapse of the gel structure does not occur substantially. It is available commercially in finely divided form and has been used heretofore in such applications as a thermal insulation medium and a flatting agent for laquers. Typical compositions of the commercial product are as follows:

|  | Percent |
|---|---|
| $SiO_2$ | 81.5 to 90 |
| $Na_2SO_4$ | 8.5 to 9.5 |
| $Al_2O_3$ and $Fe_2O_3$ | 1.0 |

The product may also contain a minor amount of volatile matter.

The absolute density of silica aerogel is in the order of 17 pounds per gallon. Its bulk density will depend on how finely the material is divided and may vary from about 6.5 to about 10 pounds per cubic foot for the commercially available product. The degree of subdivision of the particles is not particularly critical and may vary widely. The following are typical screen analyses of two forms of the commercial product designated as A and B, each of which may be employed in practicing the invention:

A

|  | Percent |
|---|---|
| On 20 mesh | 5.0 |
| Thru 20 on 60 mesh | 24.0 |
| Thru 60 on 100 mesh | 18.0 |
| Thru 100 on 200 mesh | 17.0 |
| Thru 200 mesh | 36.0 |

| B | Percent |
|---|---|
| On 100 mesh | 1.2 |
| Thru 100 on 200 mesh | 19.5 |
| Thru 200 mesh | 79.3 |

The proportion of silica aerogel to use in preparing aqueous base drilling fluid compositions generally may range from about 5 pounds per barrel to about 22 pounds per barrel based on the water content, but the preferred range is 10–18 pounds per barrel. Weighting agents may be added as customarily done to adjust the density of the drilling fluid.

Having described my invention, what I claim and desire to protect by Letters Patent is:

1. A drilling fluid comprising water and finely divided silica aerogel in a minor amount sufficient to impart thixotropic properties but insufficient to render the mixture unpumpable.

2. A drilling fluid comprising salt water and finely divided silica aerogel in a minor amount sufficient to impart thixotropic properties but insufficient to render the mixture unpumpable.

3. An aqueous base drilling fluid containing 5–22 pounds per barrel of finely divided silica aerogel based on the water content.

4. A drilling fluid composition comprising an aqueous liquid base, a weighting material and finely divided silica aerogel in a minor amount sufficient to impart thixotropic properties but insufficient to render the mixture unpumpable.

5. A drilling fluid comprising salt water and 5–22 pounds per barrel of finely divided silica aerogel based on the water content.

6. An aqueous base drilling fluid containing a weighting material and 5–22 pounds per barrel of finely divided silica aerogel based on the water content.

WILLIAM F. OXFORD, Jr.

REFERENCES CITED

The following references are of record in the file of this patent:

UNITED STATES PATENTS

| Number | Name | Date |
|---|---|---|
| 2,055,666 | Moore et al. | Sept. 29, 1936 |
| 2,109,337 | Mayfield | Feb. 22, 1938 |
| 2,260,625 | Kistler | Oct. 28, 1941 |
| 2,360,992 | Weiss | Oct. 24, 1944 |

OTHER REFERENCES

Stern, Role of Clay and Other Minerals in Oil-Well Drilling Fluids, Report of Investigations No. 3556 of Bureau of Mines, page 55.